(12) United States Patent
Zhou et al.

(10) Patent No.: US 11,499,902 B2
(45) Date of Patent: Nov. 15, 2022

(54) FORCE SENSING PROBE FOR SURFACE WETTABILITY CHARACTERIZATION

(71) Applicant: Aalto University Foundation sr, Aalto (FI)

(72) Inventors: Quan Zhou, Espoo (FI); Robin Ras, Espoo (FI); Ville Liimatainen, Helsinki (FI); Maja Vuckovac, Vantaa (FI)

(73) Assignee: Aalto University Foundation sr, Aalto (FI)

( * ) Notice: Subject to any disclaimer, the term of this patent is extended or adjusted under 35 U.S.C. 154(b) by 384 days.

(21) Appl. No.: 16/477,746

(22) PCT Filed: Jan. 17, 2018

(86) PCT No.: PCT/FI2018/050033
§ 371 (c)(1),
(2) Date: Jul. 12, 2019

(87) PCT Pub. No.: WO2018/134479
PCT Pub. Date: Jul. 26, 2018

(65) Prior Publication Data
US 2019/0376885 A1    Dec. 12, 2019

(30) Foreign Application Priority Data
Jan. 20, 2017    (FI) ..................... 20175049

(51) Int. Cl.
*G01N 13/02*    (2006.01)
*B01L 3/00*    (2006.01)

(52) U.S. Cl.
CPC ........ *G01N 13/02* (2013.01); *B01L 3/502792* (2013.01)

(58) Field of Classification Search
CPC .......................... G01N 13/02; B01L 3/502792
See application file for complete search history.

(56) References Cited

U.S. PATENT DOCUMENTS

| 5,486,337 A | 1/1996 | Ohkawa |
| 6,867,854 B1 | 3/2005 | Wapner et al. |

(Continued)

FOREIGN PATENT DOCUMENTS

| JP | 2004-144573 A | 5/2004 |
| JP | 2004144573 A * | 5/2004 |

(Continued)

OTHER PUBLICATIONS

International Search Report for corresponding International Patent Application No. PCT/FI2018/050033 dated Mar. 26, 2018, 5 pages.

(Continued)

*Primary Examiner* — John Fitzgerald
(74) *Attorney, Agent, or Firm* — Merchant & Gould P.C.

(57) ABSTRACT

A force sensing probe (100) for sensing snap-in and/or pull-off force of a liquid droplet (111) brought into and/or separated from contact with a hydrophobic sample surface (151), respectively, comprises: a sensing tip (101); a sensor element (102) connected to the sensing tip, capable of sensing sub-micronewton forces acting on the sensing tip in a measurement direction; and a droplet holding plate (104) having a first main surface (105) and a hydrophilic second main surface (106) connected via a peripheral edge surface (107), and being attached via the first main surface to the sensing tip (101) perpendicularly relative to the measurement direction for receiving and holding a liquid droplet (111) as attached to the second main surface; the droplet holding plate comprising an electrically conductive surface layer (115), the first and the second main surfaces and the peripheral edge surface being defined by the surface layer.

25 Claims, 8 Drawing Sheets

(56) References Cited

U.S. PATENT DOCUMENTS

| | | | |
|---|---|---|---|
| 7,955,865 B2* | 6/2011 | Marziali | B01L 3/0255 73/864.22 |
| 8,383,057 B2* | 2/2013 | Shibahara | B01L 3/5085 422/402 |
| 9,354,250 B1* | 5/2016 | Tseng | C12Q 1/42 |
| 2011/0113517 A1 | 5/2011 | Duerig et al. | |
| 2014/0124037 A1 | 5/2014 | Foley | |
| 2015/0362525 A1 | 12/2015 | Amemiya et al. | |
| 2016/0139177 A1* | 5/2016 | Tseng | G01Q 60/30 435/287.9 |

FOREIGN PATENT DOCUMENTS

| | | | |
|---|---|---|---|
| JP | 2005-69706 A | | 3/2005 |
| JP | 2011-191277 A | | 9/2011 |
| JP | 5457237 A | | 1/2014 |
| JP | 5457237 B2 | * | 4/2014 |
| KR | 2016-0085935 A | | 7/2016 |
| WO | WO 2008/106469 A1 | | 9/2008 |
| WO | WO 2014/124352 A1 | | 8/2014 |
| WO | WO 2016/166944 A1 | | 10/2016 |

OTHER PUBLICATIONS

Written Opinion of the International Searching Authority for corresponding International Patent Application No. PCT/FI2018/050033 dated Mar. 21, 2018, 9 pages.

International Preliminary Report on Patentability for corresponding International Patent Application No. PCT/FI2018/050033 dated May 14, 2019, 8 pages.

Finnish Office Action for corresponding Finnish Patent Application No. 20175049 dated Nov. 20, 2018, 3 pages.

Tabor, R. et al., "Measurement and analysis of forces in bubble and droplet systems using AFM", Journal of Colloid and Interface Science, 371: 1-14 (2012).

Vakarelski, U. et al., "Soft colloidal probes for AFM force measurements between water droplets in oil", Colloids and Surfaces A: Physiochemical and Engineering Aspects, 462: 259-263 (2014).

Finnish Search Report for corresponding Finnish Patent Application No. 20175049 dated Aug. 18, 2017, 2 pages.

Extended European Search Report for European Patent Application No. 18741334.9 dated Sep. 14, 2020, 10 pages.

Lee, J. et al., "Evaluation of surface wettability by means of the measurement of the adhesive force between a microstructured hydrophobic surface and a water droplet", International Journal of Precision Engineering and Manufacturing, 15(11): 2397-2404 (Nov. 2014).

* cited by examiner

FORCE SENSING PROBE FOR SURFACE WETTABILITY CHARACTERIZATION

This application is a National Stage Application of PCT/FI2018/050033, filed 17 Jan. 2018, which claims benefit of Application Serial No. 20175049, filed 20 Jan. 2017 in Finland and which applications are incorporated herein by reference. To the extent appropriate, a claim of priority is made to each of the above disclosed applications.

BACKGROUND

Wetting properties of surfaces have become of great interest in various technical fields. For example, superhydrophobic surfaces are seen as promising solution to produce self-cleaning properties to different kinds of products. Superhydrophobic surfaces can provide great advantages also, for example, in microfluidics.

In developing and studying wetting properties of surfaces for any purposes, reliable and accurate characterization techniques are needed. Traditionally, contact angle measurement has been one of the most common approaches to characterize the wetting properties of a surface. However, contact angle measurements suffer from decreased reliability especially when the contact angle exceeds 150°, making them not ideal for characterizing superhydrophobic surfaces. Further, contact angle measurements are not easily applicable to investigating wetting properties of non-flat surfaces, or spatial variations of wetting properties along a surface with high spatial resolution.

It has been shown that measurements of snap-in and pull-off forces of liquid droplets brought into and separated from contact of a hydrophobic surface, respectively, may be used to determine the wetting properties instead of observing the contact angle. However, feasibility and reliability of such measurements may greatly depend on the equipment used.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A force sensing probe is disclosed for sensing snap-in and/or pull-off force of a liquid droplet brought into and/or separated from contact with a hydrophobic sample surface, respectively. The force sensing probe comprises a sensing tip and a sensor element connected to the sensing tip, capable of sensing sub-micronewton forces acting on the sensing tip in a measurement direction defined relative to the probe. The force sensing probe further comprises a droplet holding plate having a first main surface and a hydrophilic second main surface connected via a peripheral edge surface, and being attached via the first main surface to the sensing tip perpendicularly relative to the measurement direction for receiving and holding a liquid droplet as attached to the second main surface. The droplet holding plate comprises an electrically conductive surface layer, the first and the second main surfaces and the peripheral edge surface being defined by the surface layer.

Disclosed are also an apparatus, use of the apparatus for measuring snap-in and/or pull-off force, and a method for manufacturing a force sensing probe for sensing snap-in and/or pull-off force.

DESCRIPTION OF THE DRAWINGS

The present description will be better understood from the following detailed description read in light of the accompanying drawings, wherein.

The drawings of the FIGS. are not in scale.

DETAILED DESCRIPTION

The detailed description provided below in connection with the appended drawings is intended as a description of a number of embodiments, but it is not intended to represent the only ways in which the embodiments may be constructed, implemented, or utilized.

At least some of the embodiments and examples discussed below may allow, for example, implementing sensing and measuring probes, devices, apparatuses, devices, systems, and/or processes, for accurately and reliably measuring snap-in forces of liquid droplets brought into, or pull-off forces of liquid droplets separated from, contact with a hydrophobic sample surface, or both snap-in forces and pull-off forces. Some embodiments may enable measuring such forces even with resolution of nanonewtons. Some embodiments may also enable measuring such forces at different locations on a sample surface, thereby allowing mapping the wetting properties of the hydrophobic sample surface.

A "hydrophobic" surface refers to a poorly wettable surface with contact angle of a water droplet formed thereon lying at or above 90 degrees. In the case of a "superhydrophobic" surface, the contact angle is more than 150 degrees.

The "contact angle" refers to the angle, through the liquid, in which the liquid-vapor interface of a liquid droplet on a sample surface meets the tangential of the sample surface.

"Snap-in force" refers to incremental force acting on a droplet holding member holding a liquid droplet thereon when the droplet is brought into contact with a hydrophobic sample surface. It thus refers to the force acting on the droplet holding element at the time the droplet forms a contact with the sample surface, thus becomes "snapped in" by the sample surface. The snap-in force is an attracting force directed towards the sample surface.

"Pull-off force" refers to incremental force acting on a droplet holding member holding a liquid droplet thereon when the droplet, initially in contact with a hydrophobic sample surface, is separated from contact with the sample surface. It thus refers to the force acting on the droplet holding member at the time the droplet separates from contact with the sample surface, thus becomes "pulled off" from the sample surface. The pull-off force is a retracting force directed away from the sample surface. It can alternatively be considered as referring to ceasing of the attracting force acting on the droplet holding member via the droplet when it is in contact with the sample surface.

Figure 1:
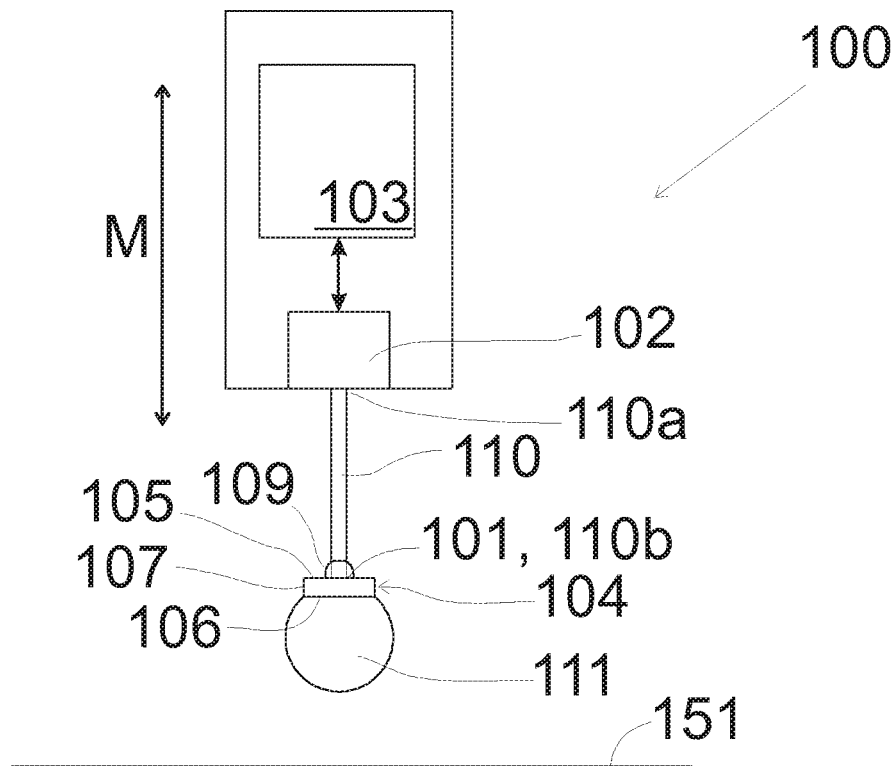
FIG. 1 illustrates schematically a force sensing probe with a droplet holding plate for sensing snap-in and/or pull-off forces between a liquid droplet and a hydrophobic sample surface.

The force sensing probe 100 of FIG. 1 comprises a sensing tip 101, connected to a sensor element 102 which is capable of sensing sub-micronewton forces, i.e. forces with sensing resolution less than a micronewton, acting on the sensing tip in a measurement direction M defined relative to the force sensing probe. The sensing resolution of the sensor element may lie even in nanonewton range, i.e. it may be tens of nanonewtons or even less, for example, one or few nanonewtons.

"Force sensing probe" refers to a device, module, or element by which a force may be sensed, and which may produce an electrical output signal dependent of the force, the output signal enabling determining the magnitude of that force. Said determination may take place in the force sensing probe itself, or elsewhere in an apparatus in which the force sensing probe is incorporated, or to which the force sensing probe is connected. The determination of the magnitude of the force may also take place in another device or apparatus. The entire process until determination of the magnitude of the force may be considered as "measuring" the force.

"Sensor element" of a force sensing probe refers to an element capable of, possibly provided that the sensor element is connected to appropriate electronics, producing a primary electrical signal depending on a force acting on the sensing tip of the force sensing probe. The primary signal may be then provided as such as the output signal of the force sensing probe. Alternatively, the primary electrical signal may be first processed in any appropriate means to finally produce the output signal of the force sensing probe on the basis of the primary electric signal. In the example of FIG. 1, the sensor element is connected to a control unit 103 configured to enable said producing of the primary electric signal and/or processing it to form the output signal of the force sensing probe. The control unit may comprise, for example, any appropriate electronics and/or one or more processors. In other embodiments, such separate control unit may be omitted, and any appropriate electronics and signal processing means may be included in the sensor element itself.

Being defined relative to the force sensing probe refers to the measurement direction M following the position of the force sensing probe. Thus, the direction of the measurement direction, as observed in external coordinates, depends on the position of the force sensing probe in those coordinates.

A sensor element of a force sensing probe may be based on any appropriate sensor configuration and sensor technology. For example, the sensor element 102 of FIG. 1 may be implemented as a capacitive microelectromechanical system MEMS sensor element. In other embodiments, sensor elements based on other sensing principles, such as piezoresistive sensor elements, or optical sensing, may be used. Further, sensor element configurations other than those based on MEMS may be used.

Attached to the sensing tip 101, the force sensing probe comprises a droplet holding plate 104 having a first main surface 105 and a second main surface 106, which main surfaces are connected via a peripheral edge surface 107.

A "plate" refers to a generally plate-like structure having two substantially parallel main surfaces extending substantially in a lateral direction, the two main surfaces facing to opposite directions and being separated in a thickness direction from each other. The main surfaces may be planar. Alternatively, one or both of them they may be slightly curved to form a concave or convex surface.

A "peripheral edge surface" refers to a surface of a plate at the edge thereof, extending mainly in the thickness direction, between the main surfaces of the plate, the main surfaces of the plate being thereby connected via the peripheral edge surface.

Thus, the overall surface of a plate may be considered as comprising three portions, namely, the two main surfaces and the peripheral edge surface.

The droplet holding plate 104 is attached to the sensing tip 101 via its first main surface 105. In the example of FIG. 1, the attachment is made by a bead of adhesive 109 applied between the first main surface 105 of the droplet holding plate and the sensing tip 101. The adhesive may comprise, for example, any suitable glue providing sufficient adhesive force to keep the droplet holding plate attached to the sensing tip during snap-in and/or pull-off force measurements. The adhesive may be applicable in substantially liquid form and curable thereafter as being exposed to air, heat, and/or, for example light such as ultraviolet (UV) light. Instead of a bead as that illustrated in FIG. 1, in other embodiments, adhesive may be applied as a thin layer between the sensing tip and the droplet holding plate.

The adhesive may be solvable to facilitate replacement of the droplet holding plate with a new one. Depending on the type of the adhesive, the solvent may be, for example, acetone, isopropanol, or ethanol, without being limited to these examples. One example of commercially available adhesives successfully tested for attaching a droplet holding plate to a sensing tip is Byllux 5118 supplied by BYLA GmbH, which is a one-component system solvable by dimethyl sulfoxide (DMSO). In the case of solvents with low boiling temperature resulting in rapid evaporation at room temperature (293 K) or other temperature in which the solving is to be carried out, solving the adhesive and thereby detaching the droplet holding plate from the sensing tip may be carried out, for example, by immersing the sensing tip with the droplet holding plate into sufficiently large volume of the solvent.

The second main surface 105 of the droplet holding plate is hydrophilic, possibly superhydrophilic.

A "hydrophilic" surface refers to a wettable surface with contact angle of a water droplet formed thereon lying below 90 degrees. In the case of a "superhydrophilic" surface, the contact angle is less than 10 degrees. The lower is the contact angle, the larger is the area on which a droplet with a specific volume spreads on the surface. At an extreme situation, no droplet at all is formed, but a water droplet brought to a surface is spread into a uniform layer on the surface.

Hydrophilicity of a surface may be an inherent material property. Alternatively, or in addition to the surface material's inherent properties, wetting performance of a surface may be affected, for example, by appropriate surface treatment producing specific micro/nanostructure (topography) on the surface. Instead of, or in addition to surface topography, it is possible to alter the chemical composition of the surface (chemical modification).

In FIG. 1, the force sensing probe is illustrated as having a water droplet 111 formed on, and attached to the second main surface of the droplet holding plate. In other embodiments, liquid other than water may be used.

The hydrophilicity of the second main surface of the droplet holding plate may allow reliably controlling formation of the water droplet on the second main surface, and holding the thereby formed droplet by the droplet holding plate, as attached to the second main surface.

In the example of FIG. 1, the sensing tip 101 is connected to the sensor element 102 via an elongated arm 110 extending in the measurement direction M. The arm has a first end 110a connected to the sensor element, and a second end 110b forming the sensing tip which thus lies at the second end of the arm.

The elongated arm 110 may have any appropriate length. It may lie, for example, in the range of tens of micrometers to some millimeters, for example, from 500 micrometers to 10 millimeters. The arm may have a thickness, for example, in the range of some tens of micrometers to some hundreds of micrometers, for example, from 50 micrometers to 500 or 1000 micrometers. Appropriate dimensions depend, for example, on the material of the arm and its connection to the sensor element. For example, an integral, silicon-based microelectromechanical component with a capacitive sensor element and an elongated arm with a length of 3 mm and a thickness of 300 micrometers has been successfully tested.

The elongated arm with the sensing tip, and the sensor element may be formed as one integral body. In other embodiments, an elongated arm may be attached to a sensor element.

In other embodiments, other arrangements may be used. For example, a sensing tip may be directly connected to a sensor element, without any elongated arm therebetween. In yet other embodiments, an elongated arm or beam connected, via its first end, to a sensor element, may be directed perpendicularly to the measurement direction of the force sensing probe. In such arrangement, the arm or beam may be bendable, in response to forces acting on the sensing tip lying at the second end of the arm or beam, so as to allow movement of the sensing tip in the measurement direction.

Figure 2:
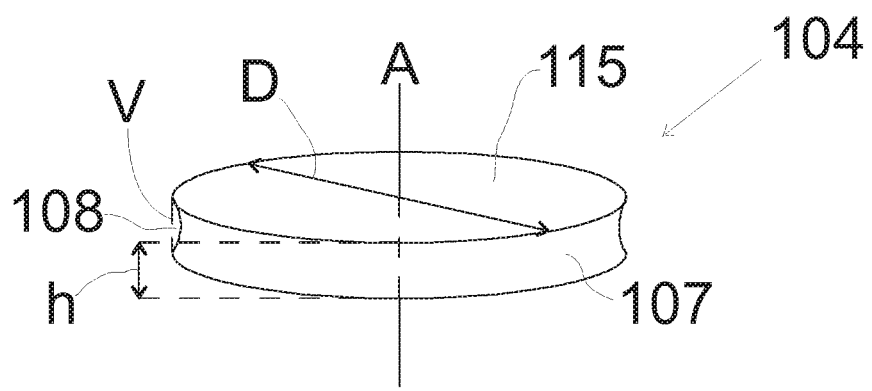
FIGS. 2 and 3 illustrate schematically the droplet holding plate of FIG. 1.

As illustrated in FIG. 2, the droplet holding plate 104 has a shape of a circular disc. A circular disc may allow accurate droplet size and shape control as the droplet may be formed with its inherently rotationally symmetrical shape following the circular shape of the second main surface. However, in other embodiments, other shapes may be used, such as those of rectangle or square, possibly having rounded corners.

In the example of FIG. 2, the peripheral edge surface 107 does not extend straight in the thickness direction of the droplet holding plate. Instead, it is formed as a concave surface forming an undercut 108 deviating the peripheral edge surface from a fictitious straight "vertical" surface V towards the fictitious center axis A of the droplet holding plate.

The circular droplet holding plate 104 of FIG. 2 has a diameter D which may be, for example, less than or equal to 1 mm, or less than or equal to 5 mm. Because a circular shape has just one diameter, irrespective of the direction in which the diameter is defined, that diameter is also the "maximum diameter" of the droplet holding plate 104. In other embodiments, with the droplet holding plate having some other shape than circular, the maximum diameter of the droplet holding plate may be correspondingly less than or equal to 1 mm, or less than or equal to 5 mm. Thereby the maximum volume of a droplet held by the droplet holding plate may be limited, for example, to about 1 to 2 µl. For example, with a circular disc with a maximum diameter of 1 mm, a droplet of about 1.5 µl may be formed on the second main surface of the droplet holding plate.

Limiting the diameter or maximum diameter of the droplet holding plate limits the weight of the droplet holding plate, and thus the force applied to it and the sensing tip by earth gravity. Thus, with the measurement direction directed as aligned with the earth gravity, larger part of the overall force sensing range of the force sensing probe may be used for the actual snap-in and/or pull-off force measurements. However, in other embodiments, it is possible to have droplet holding plates with diameter or maximum diameter higher than 1 mm.

Further, limiting the diameter or maximum diameter of the droplet holding plate consequently limits the size of the liquid droplet which can be formed on the second main surface. Small size of the droplet may be advantageous, at least, in two aspects.

First, the smaller is the size of the liquid droplet, the lower is its weight, and consequently the force applied to it and the sensing tip by earth gravity. Thus, with the measurement direction directed being aligned with the earth gravity, larger part of the overall force sensing range of the force sensing probe may be used for the actual snap-in and/or pull-off force measurements.

Second, the smaller is the physical size of the droplet, the smaller is the contact area between the droplet and the sample surface 151, and thus the higher is the spatial accuracy of the snap-in and/or pull-off force measurement. In other words, snap-in and/or pull-off force can be measured accurately at the desired location on the sample surface to be investigated. This may further allow analyzing local variations in the wetting properties of the sample surface by measuring the snap-in and/or pull-off forces at locations with close spatial separation.

To further limit the weight of the droplet holding plate 104, it may have a thickness h of less than or equal to 500 µm. Even more preferably, the thickness may be less than or equal to 100 µm.

As an advantageous feature, the droplet holding plate comprises an electrically conductive surface layer 115 which defines the first and the second main surfaces and the peripheral edge surface. The electrically conductive surface layer thereby covers the droplet holding plate on each side thereof. This results in the overall surface of the droplet holding plate being electrically conductive.

The electrically conductive surface layer may advantageously prevent or decrease disturbances caused by electrostatic forces between the force sensing probe and a sample surface to be investigated, the electrostatic forces resulting from possible accumulation of electric charges in the sensing tip, in the droplet holding plate, and/or in a liquid droplet attached to the latter. The lower are the snap-in and/or pull-off forces to be measured, the more detrimentally might such electrostatic forces affect the force measurements.

The electrically conductive material may be, for example, some metal, or any other appropriate material with sufficiently high electrical conductivity to prevent or decrease accumulation of electric charges in the droplet holding plate and/or in a liquid droplet attached to it. The electrically conductive surface layer may have, for example, sheet resistance of less than or equal to 1000 Ω. Sheet resistance refers here to the standard definition thereof, i.e. the DC (Direct Current) resistance of a square-form film or layer. As an alternative to the notation expressing the sheet resistance in terms of ohms (Ω), the sheet resistance can also be expressed in terms of ohms per square (e.g. Ω/square, Ω/sq, or Ω/☐).

Figure 3:
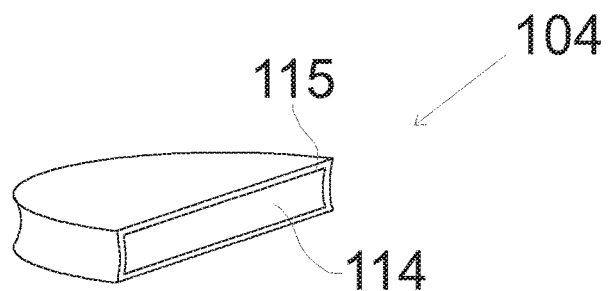

The electrically conductive surface layer is illustrated in more detail in FIG. 3.

In the example of FIG. 3, the droplet holding plate 104 comprises an inner body 114 which may be formed of any appropriate material with suitable material properties, such as sufficient rigidity, as well as compatibility with appropriate microfabrication processes to allow forming of a properly sized droplet holding plate.

Sufficient rigidity refers generally to the capability of the droplet holding plate with relatively low thickness to maintain its original shape without, for example, becoming substantially curved. Rigidity is also required to prevent the droplet holding plate from bending during contact of a droplet held by the droplet holding plate and a sample surface to be investigated. Rigidity thus refers to the mechanical stability of the droplet holding plate.

In some embodiments, the inner body may have formed of material with density lower than that of the electrically conductive surface layer 115.

With the density of the inner body material lower than that of the electrically conductive surface layer material, the weight of the droplet holding disc may be decreased in comparison to an inner body formed of a material with density which is higher or equal to the density of the surface layer. However, in other embodiments, inner bodies with density higher than or equal to the density of the surface layer may be used.

The inner body may be formed, for example, of a photoresist SU-8 has found suitable material from density, manufacturing, and rigidity points of view. Also other epoxy based, negative tone photoresists may be used. Other examples of possible materials include metals, polymers, various types of glass, and semiconductors such as silicon. For example, semiconductors may be advantageous from the manufacturing point of view in that they may be processed into desired shape and dimensions of the droplet holding plate using standardized processes.

The inner body 114 lies beneath the electrically conductive surface layer 115 which may be formed, for example, of gold. Gold provides high electrical conductivity, and a clean, smooth gold surface may be inherently hydrophilic. In other embodiments, any other appropriate electrically conductive material may be used.

A layered structure of a droplet holding plate, comprising an inner body and a surface layer lying on the inner body provides flexible possibilities to optimize the properties of the droplet holding plate. The electrically conductive surface layer may be optimized for the electrical conductivity and possible other properties which are relevant for the surface of the droplet holding plate. On the other hand, the inner body may be optimized, for example, for the rigidity, manufacturing compatibility, density, and possible other properties which are relevant for the inner part of the droplet holding plate.

In other embodiments, droplet holding plates may comprise single integral body formed of one single electrically conductive material. In such case, the "surface layer" refers to surface portion of the droplet holding plate with a finite thickness, extending from the surface of the droplet holding plate towards the inner parts thereof.

Any of the force sensing probes discussed above may be used to sense snap-in force and/or pull-off force generated when a liquid droplet, received and held by the droplet holding plate, is brought into, or separated from, contact with a sample surface, the wetting properties of which are to be investigated. In practice, this may be carried out by moving the force sensing probe, relative to the sample surface, in the measurement direction of the force sensing probe towards and/or away from such sample surface, respectively, while sensing the forces acting on the sensing tip, in particular, the changes in those forces. When incorporated as part of an appropriate apparatus comprising suitable measurement system, the forces sensed by the force sensing probe may be determined, i.e. measured. Said relative movement may be carried out by having the force sensing probe stationary and moving the sample surface.

Figure 4:
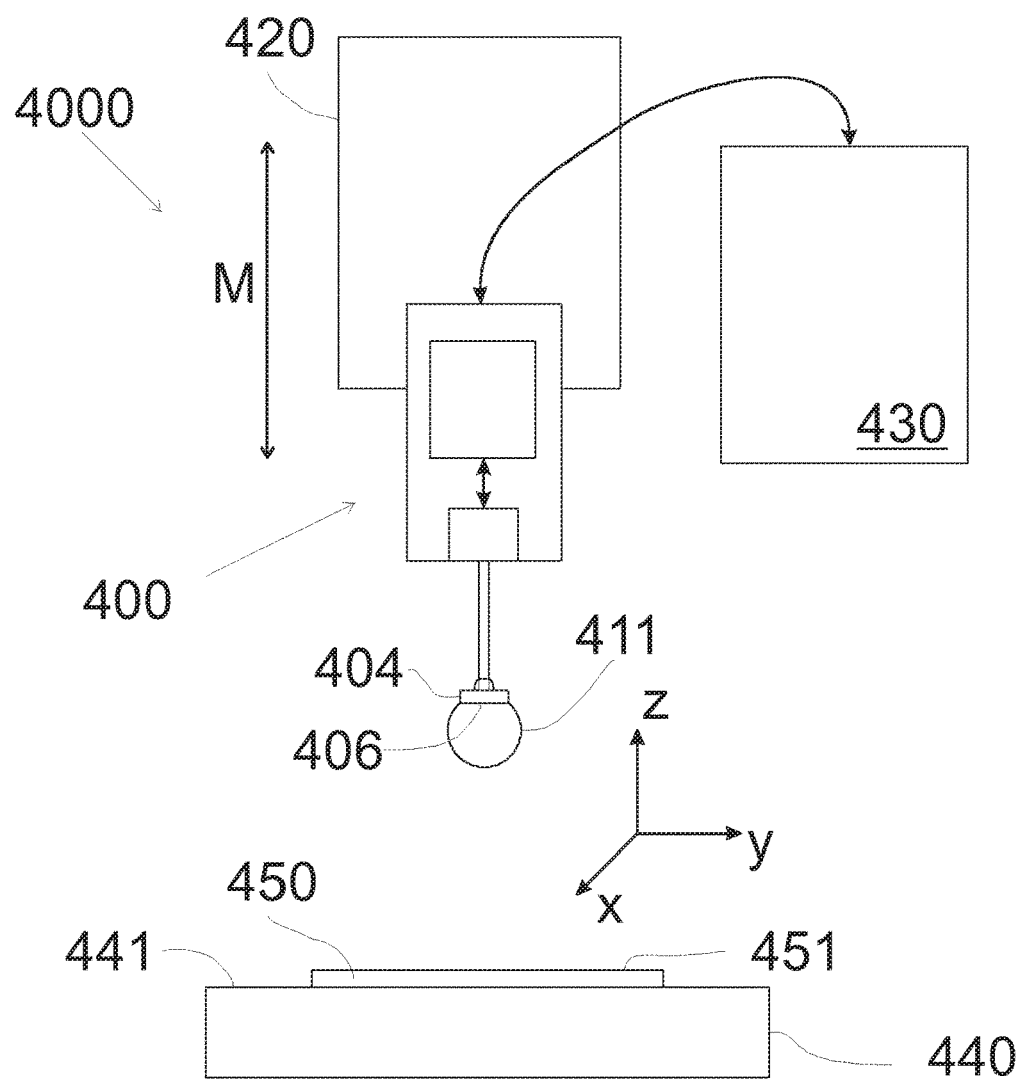
FIGS. 4 and 5 illustrate schematically an apparatus for measuring snap-in and/or pull-off forces.

An example of an apparatus which may be used for measuring snap-in and/or pull-off forces of a liquid droplet brought into and/or separated from contact with a hydrophobic sample surface is illustrated in FIG. 4.

The apparatus 4000 of FIG. 4 comprises a force sensing probe 400 which may be in accordance with any of the force sensing probes discussed above. The force sensing probe is attached to a support body 420. The force sensing probe is electrically connected to a central unit 430 configured to control the operation of the force sensing probe and receive the output signals thereof. The central unit 430 is also configured to carry out the actual determination of the forces sensed by the force sensing probe 400.

The central unit may be implemented in any appropriate manner. For example, it may comprise at least one processor and at least one memory coupled to the at least one processor, the memory storing program code instructions which, when executed on the at least one processor, cause the processor to perform the action force determination. Alternatively, or in addition, the operations of the central unit can be carried out, at least in part, by one or more hardware logic components.

The apparatus further comprises a sample support 440, having a sample support surface 441 facing towards the force sensing probe 400, and being arranged to be movable in vertical direction, the "vertical" direction referring, in the example of FIG. 4, to the measurement direction M of the force sensing probe.

The movability of the sample support makes the sample support and the force sensing probe movable relative to each other in the measurement direction.

In FIG. 4, the sample support lies at a distant position, with the liquid droplet 411 formed on the second main surface 406 of the droplet holding plate at a distance from a sample 450 lying on the sample support surface 441 of the sample support 440, thus supported by the sample support.

Figure 5:
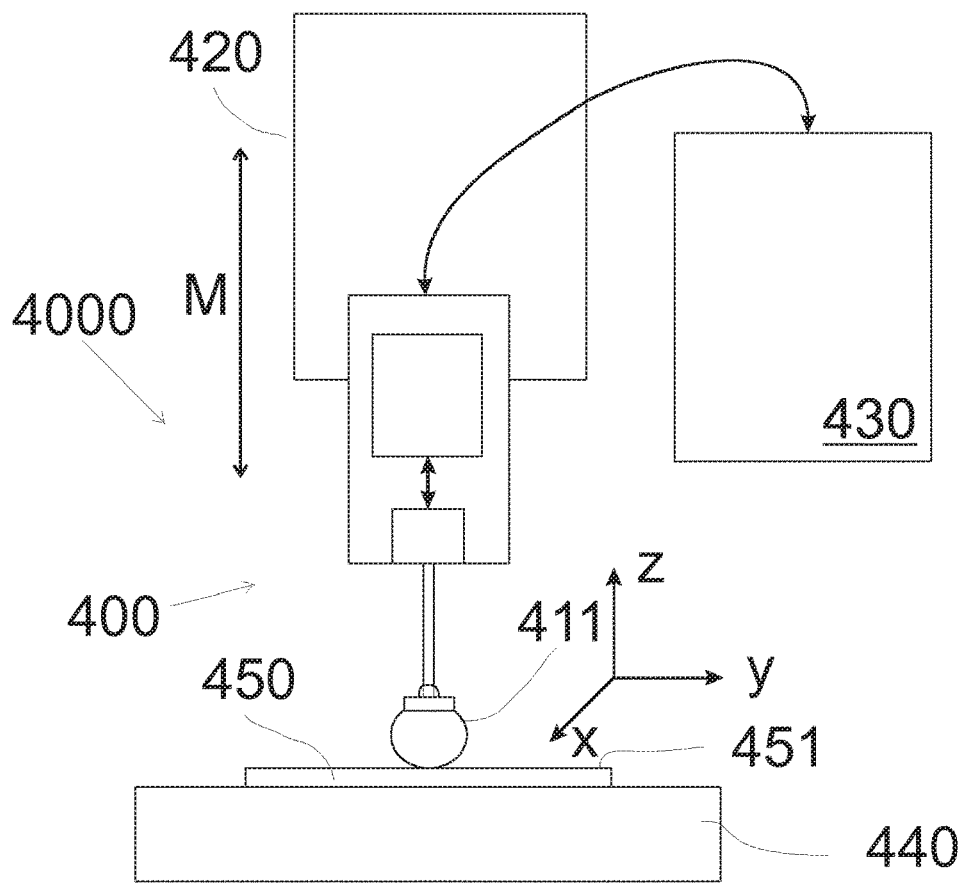

In FIG. 5, the apparatus 4000 of FIG. 4 is illustrated with the sample support 440 and the force sensing probe 400 moved relative to each other into a contact position with the liquid droplet 411 in contact with the surface 451 of sample 450, i.e. a "sample surface".

In the example of FIGS. 4 and 5, the sample support is further arranged to be movable in two mutually orthogonal transverse directions perpendicular to the measurement direction, making the sample support and the force sensing probe movable relative to each other also in those transverse directions. In other embodiments, a sample support and a force sensing probe may be movable relative to each other in the measurement direction only, or in the measurement direction and in one transverse direction only.

The movability of the sample support in the measurement direction M may be achieved, for example, by having the sample support attached to a motorized, high precision XYZ stage, wherein "X" and "Y" refers to horizontal directions perpendicular to the measurement direction M, and "Z" refers to the vertical direction aligned with the measurement direction M.

The apparatus of FIGS. 4 and 5 may be used as positioned with the measurement or "vertical" direction aligned to the direction in which the earth gravity acts.

In other embodiments, the relative movability of the sample support and the force sensing probe in one or more of the vertical and horizontal or transverse directions may be achieved by having the force sensing probe, or possible support body to which it is attached, movable correspondingly. It is also possible that both the sample support and the force sensing probe are arranged to be movable.

Figure 6:
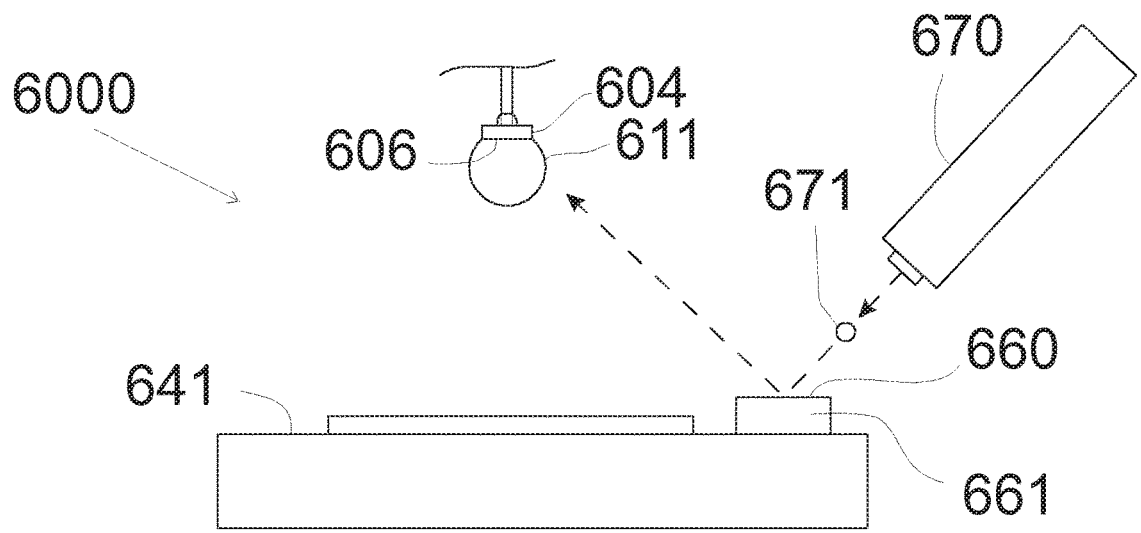
FIG. 6 illustrates schematically another apparatus for measuring snap-in and/or pull-off forces.

The apparatus 6000 illustrated partially in FIG. 6 may be basically in accordance with any of the apparatuses discussed above.

The apparatus 6000 of FIG. 6 further comprises a hydrophobic surface element 660 and a dispenser 670 capable of shooting sub-nanolitre liquid droplet elements 671. The hydrophobic surface element may be superhydrophobic.

"Hydrophobic surface element" refers to a surface element which is hydrophobic. In the example of FIG. 6, the hydrophobic surface element 660 is the free, "upper" surface of a surface element body 661 attached on the sample support surface 641. In other embodiments, a hydrophobic surface element may be formed, for example, as a specific part of, or area on, the sample support surface, treated or structured so as to be hydrophobic or superhydrophobic. In yet other embodiments, the entire sample support surface 641 may be hydrophobic or superhydrophobic, in which case a specific area of it may serve as a hydrophobic surface element.

The dispenser 670 and the hydrophobic surface element 661 are configured and positioned so that the droplet elements 671 shot by the dispenser hit the hydrophobic surface element, and bounce off it, propagating thereafter further to the second main surface 606 of the droplet holding plate 604 or the liquid droplet 611 already formed thereon.

The arrangement of the dispenser and the hydrophobic surface element allows forming the liquid droplet 611 accurately by shooting sub-nanolitre liquid droplets to the droplet holding plate via the hydrophobic surface element. Further, after the liquid droplet 611 having been in contact with a sample surface, the liquid droplet may be re-loaded by shooting one or more additional liquid droplet elements to it.

The arrangement for shooting the liquid droplet elements via the hydrophobic surface element may provide great advantages in that the assembly of the apparatus, especially the sample support, the force sensing probe, and the dispenser, may be packaged within limited space, for example, in comparison to an arrangement with a dispenser directed to shoot liquid droplet elements directly towards a droplet holding member. On the other hand, this arrangement may allow more space for the transverse ("XY") movement of the sample support relative to the force sensing probe, thereby enabling having a larger working area for the measurements.

In other embodiments, apparatuses may be implemented with a dispenser capable of shooting sub-nanolitre liquid droplet elements, and being configured and positioned to make the droplet elements shot by the dispenser hit directly the second main surface of the droplet holding plate. Also in such embodiments, liquid droplets may be formed and/or re-loaded with high accuracy by shooting sub-nanolitre liquid droplets to the droplet holding plate.

Any of the apparatuses discussed above may be used in a process for measuring snap-in and/or pull-off force of a liquid droplet brought into and/or separated from contact with a hydrophobic sample surface of a sample placed on the sample support, respectively.

Figure 7:
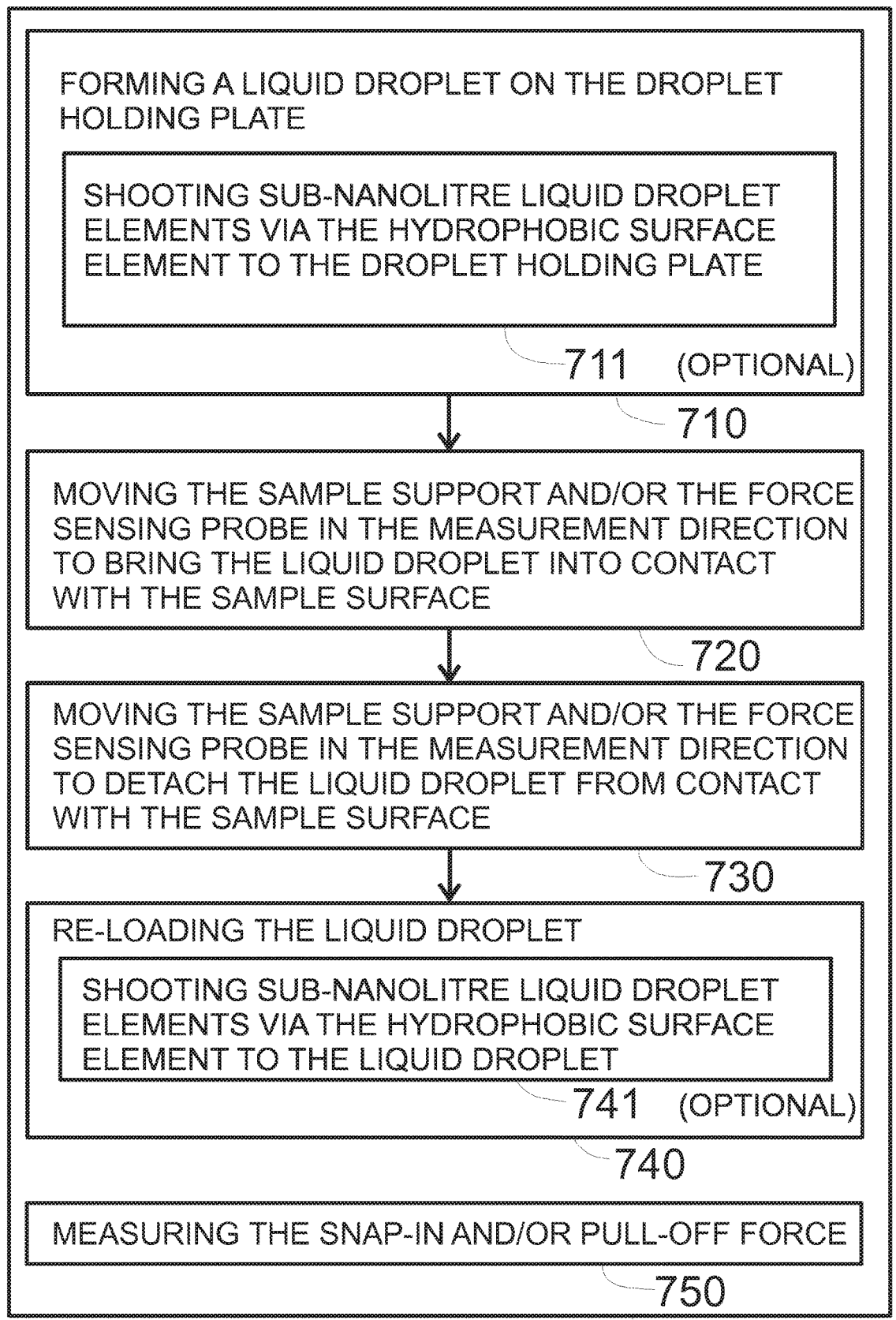
FIGS. 7 and 8 illustrate uses of apparatuses for measuring snap-in and/or pull-off forces.

Such use or process may comprise, for example, operations illustrated in FIG. 7. The apparatus by which the example process 700 of FIG. 7 may be carried out comprises a hydrophobic surface element and a dispenser in accordance with those discussed above with reference to FIG. 6.

The example process of FIG. 7 starts, in optional operation 710, forming a liquid droplet on the second main surface of the droplet holding plate, said forming comprising, in sub-operation 711, shooting sub-nanolitre liquid droplet elements by the dispenser to the second main surface of the droplet holding plate via the hydrophobic surface element. The liquid droplet may be formed, for example, of water. In other embodiments, the liquid droplet, which may be formed of any appropriate liquid suitable for wetting characterization, may be formed in any other appropriate way, in which case also an apparatus without a hydrophobic surface element on the sample support and a dispenser may be used. In yet other embodiments, uses of apparatuses, or corresponding processes, may be implemented which do no comprise forming the liquid droplet.

The process or use of FIG. 7 comprises moving, in operation 720, the force sensing probe having the liquid droplet held by the droplet holding plate and the sample support towards each other in the measurement direction other until the liquid droplet contacts the sample surface.

The process of FIG. 7 comprises further moving, in operation 730, the force sensing probe with the liquid droplet held by the droplet holding plate and the sample support away from each other until the droplet detaches from the sample surface.

Moving the force sensing probe and the sample support towards and away from each other refers to moving the force sensing probe and the sample support relative to each other. That relative movement may be carried out by moving the force sensing probe or the sample support, or both of them.

In optional step 740, the process further comprises re-loading the liquid droplet held by the droplet holding plate after detachment of the liquid droplet from the sample surface. In sub-operation 741, this is carried out by shooting one or more sub-nanolitre liquid droplet elements by the dispenser to the liquid droplet via the hydrophobic surface element. In other embodiments, re-loading may be carried out by any other appropriate manner. In yet other embodiments, uses of apparatuses, or corresponding processes, may be implemented which do no comprise re-loading the liquid droplet.

Said reloading may enable restoring the liquid droplet after contact with the sample surface, such contact possibly causing disengagement of small amounts of the liquid from the droplet, resulting in change of the dimensions and mass of the droplet. In controlling the re-loading operation, the force sensing capability of the force sensing probe may be utilized to accurately determine the amount of the liquid to be re-loaded into the liquid droplet via monitoring the gravity force acting on the sensing tip via the liquid droplet and the droplet holding plate.

Such re-loading of the liquid droplet may allow carrying out sequential snap-in and/or pull-off force measurements reliably, with equally sized droplet for each measurement. Such sequential measurements may be carried out for one single measurement location on the sample surface. Further, force measurements may be carried out reliably for several different measurement locations on the sample surface, as illustrated in FIG. 8.

In operation 750, which may be carried out simultaneously with, or after, the above operations of moving the force sensing probe and the sample support relative to each other, the process of FIG. 7 comprises measuring the snap-in force acting on the sensing tip in the measurement direction at the time of the droplet contacting the sample surface, and/or the pull-off force acting on the sensing tip in the measurement direction at the time of the droplet detaching from the sample surface. Thus, the process comprises measuring at least one of the snap-in and pull-off forces. The actual measuring, comprising determination of the force(s) sensed by the force sensing probe, may be carried out, for example, by a central unit included in the apparatus, and configured to serve for this purpose.

Any of the operations discussed above or below may be carried out automatically. "Automatically" refers to carrying out the operation(s) at issue by means of appropriate equipment, according to specific rules and procedures which may be defined e.g. any appropriate program code instructions run in one or more processors controlling one or more actuators and/or data processing units or modules, without need for any contribution provided or determination performed by a user of an apparatus or device incorporating such equipment. Carrying an operation out automatically does not exclude, however, initiating the operation or setting some adjustable parameters relating to that operation by a user of the apparatus.

Figure 8:
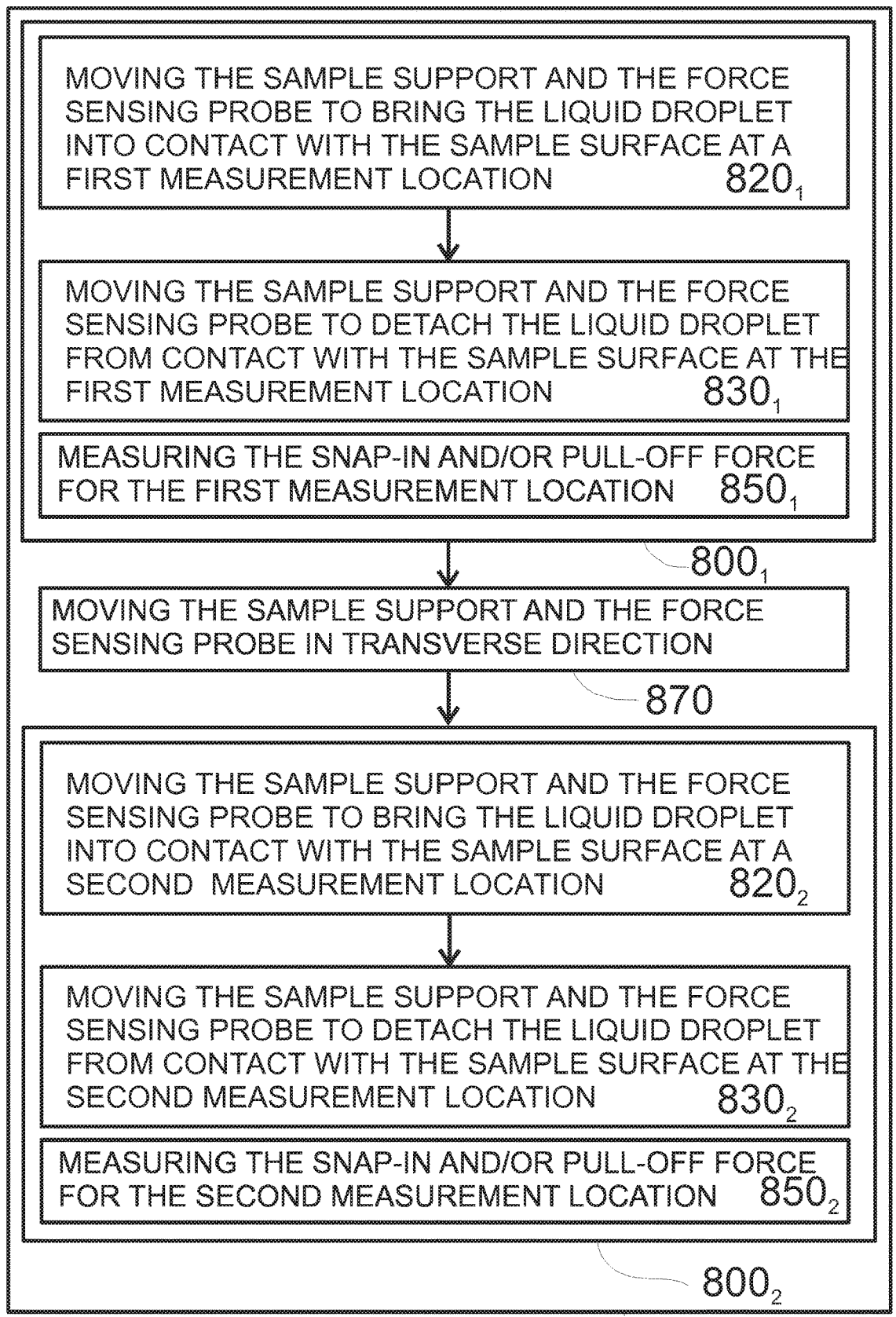

In the apparatus by which the example process of FIG. 8 may be carried out, the sample support is arranged to be movable, in addition to the measurement direction, also in one or more transverse direction perpendicular to the measurement direction. Such apparatus may be, for example, as that discussed above with reference to FIG. 4.

The process 800 of FIG. 8 comprises, in first process part 8001, for a first measurement location on the sample surface, the operations 8201, 8301, 8501 of carrying out relative movement of the sample support and the force sensing probe in the measurement direction as well as measuring the snap-in and/or pull-off force in accordance to the corresponding operations 720, 730, and 750 of the process of FIG. 7. Although not illustrated in FIG. 8, the first process part may further comprise any of the operations of forming and re-loading the liquid droplet.

In operation 870, the sample support and the force sensing probe are moved relative to each other in at least one transverse direction perpendicular to the measurement direction.

The process further comprises, in second process part 8002, in operations 8202, 8302, and 8502, carrying out relative movement of the sample support and the force sensing probe as well as measuring the snap-in and/or pull-off force for a second measurement location on the sample surface, similarly to the operations 8201, 8301, and 8501 performed for the first measurement location. For one or both of the first and the second measurement locations, the operations of relatively moving the sample support and the force sensing probe in the measurement direction and measuring the snap-in and/or pull-off forces may be carried out several times.

Although not illustrated in FIG. 8, the second process part may further comprise, similarly to the process of FIG. 7, forming the liquid droplet on the second main surface of the droplet holding plate, and/or re-loading liquid droplet between sequential contacts between the liquid droplet and the sample surface.

In the examples of FIGS. 7 and 8, the operations of moving the force sensing probe and the sample support relative to each other may be carried out by any appropriate actuators and/or motors included in the apparatus and configured to serve for this purpose.

In the above description, force sensing probes, apparatuses comprising such force sensing probes, and uses thereof are discussed. Below, manufacturing of force sensing probes is discussed. What is stated above, in the context of the force sensing probes, apparatuses, and uses about the details, definitions, and the possible advantages, apply, mutatis mutandis, also to the method aspect discussed below.

Figure 9:
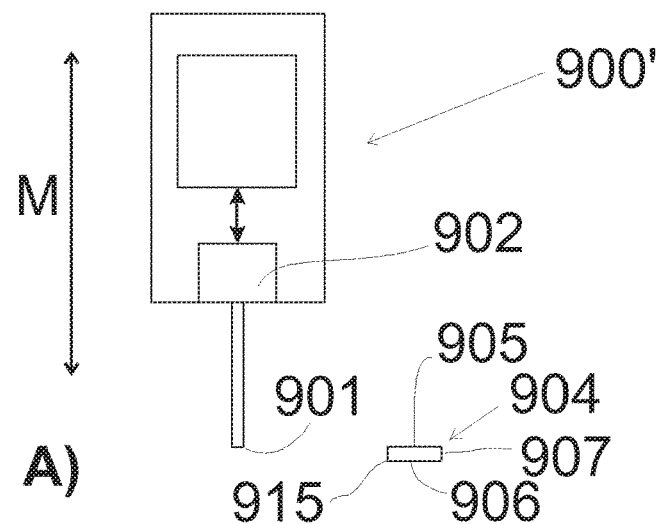
FIGS. 9 to 11 illustrate methods for manufacturing force sensing probes and droplet holding plates thereof.
Figure 9:
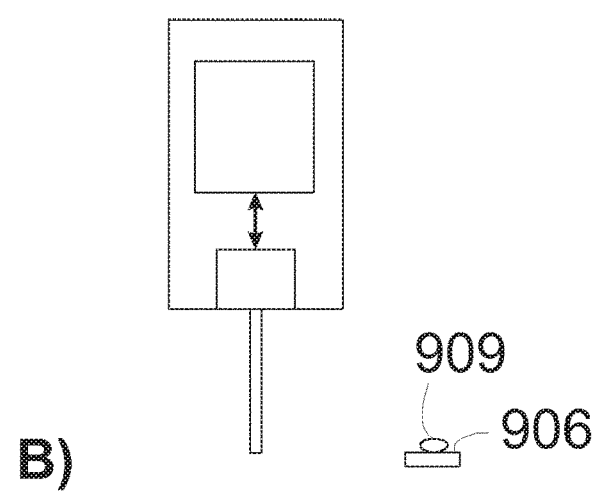
Figure 9:
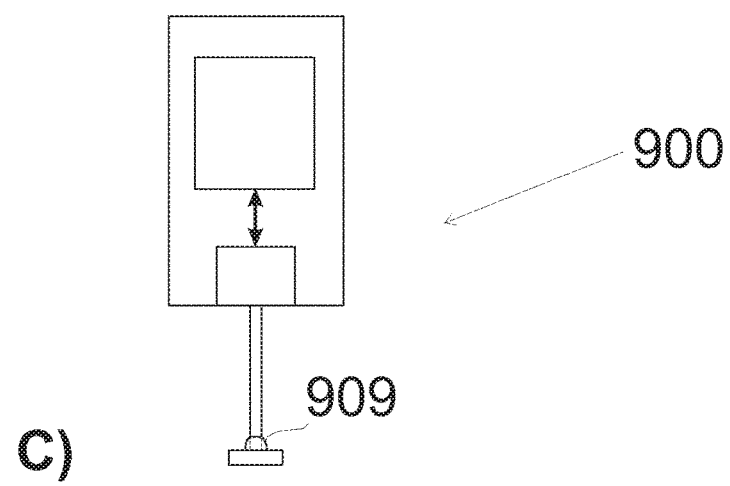

The method of FIG. 9 may be used to manufacture or assemble a force sensing probe which may be in accordance with any of the force sensing probes discussed above with reference to FIGS. 1 to 6. The force sensing probe manufactured by the method may be used for sensing snap-in and/or pull-off force of a liquid droplet brought into and/or separated from contact with a hydrophobic sample surface, respectively.

The manufacturing process starts, as illustrated in drawing A of FIG. 9, by providing a sensing tip 901 and a sensor element 902 connected to the sensing tip, as well as a droplet holding plate. In the example of FIG. 9, the sensing tip and the sensor element form parts of a force sensing probe module 900' which may be similar to any of the force sensing probes discussed above with reference to FIGS. 1 to 6, except of the droplet holding plate which is missing from the force sensing probe module.

Similarly to the sensor element 102 discussed above, the sensor element 902 of FIG. 9 is capable of sensing submicronewton forces acting on the sensing tip 901 in a measurement direction M defined relative to the complete force sensing probe to be manufactured or assembled in the method.

The droplet holding plate 904 may be in accordance with any of the droplet holding plates discussed above with reference to FIGS. 1 to 6. The droplet holding plate 904 has a first main surface 905 and a hydrophilic second main surface 906 for receiving and holding a liquid droplet as attached to the second main surface, the first and the second main surfaces being connected via a peripheral edge surface 907, the droplet holding plate comprising an electrically conductive surface layer 915, the first and the second main surfaces and the peripheral edge surface being defined by the surface layer.

The method further comprises, as illustrated in drawings B and C of FIG. 9, attaching the droplet holding plate to the sensing tip via the first main surface to form a complete force sensing probe 900.

The droplet holding plate is attached so that the attached droplet holding plate lies perpendicularly relative to the measurement direction M.

In the example of FIG. 9 said attachment is carried out by first applying, as illustrated in drawing B of FIG. 1, a small droplet of a liquid adhesive 909 on the first main surface of the droplet holding plate. In other embodiments, adhesive may be applied at the sensing tip. In yet other embodiments, adhesive may be applied onto the droplet holding plate and/or to the sensing tip in other form than a droplet of a liquid adhesive.

Next, as illustrated in drawing C of FIG. 9, the droplet holding plate 904 and the sensing tip are moved relative to each other so that the sensing tip 901 is brought into contact with the adhesive, and the adhesive is then cured, whereby a solid bead of the adhesive 909 is formed. Curing may be carried out, for example, by means of UV light and/or heat, depending on the type of the adhesive.

In other embodiments, an adhesive may be applied on the droplet holding plate, for example, as a thin layer instead of a droplet, and the adhesive is not necessarily curable or initially in liquid form. In yet other embodiments, attaching may be carried out, instead of an adhesive, for example, by soldering.

In any embodiment utilizing an adhesive, the adhesive may be solvable. Solvable refers to the possibility to dissolve the adhesive, thereby releasing the droplet holding plate from the sensing tip. Dissolving may be carried out, depending on the type of the adhesive, by any appropriate dissolving agent or by exposing the adhesive to any other appropriate conditions capable of breaking the attachment formed by the adhesive, such as heat or some specific type of electromagnetic radiation.

Solvability of the adhesive may advantageously enable replacement of the droplet holding plate while saving the rest of the force sensing probe.

In the example of FIG. 9, the force sensing probe module and the droplet holding plate may be provided as ready, complete elements. Alternatively, "providing" a droplet holding plate may comprise manufacturing thereof. An example of such approach is illustrated in FIG. 10.

Figure 10:
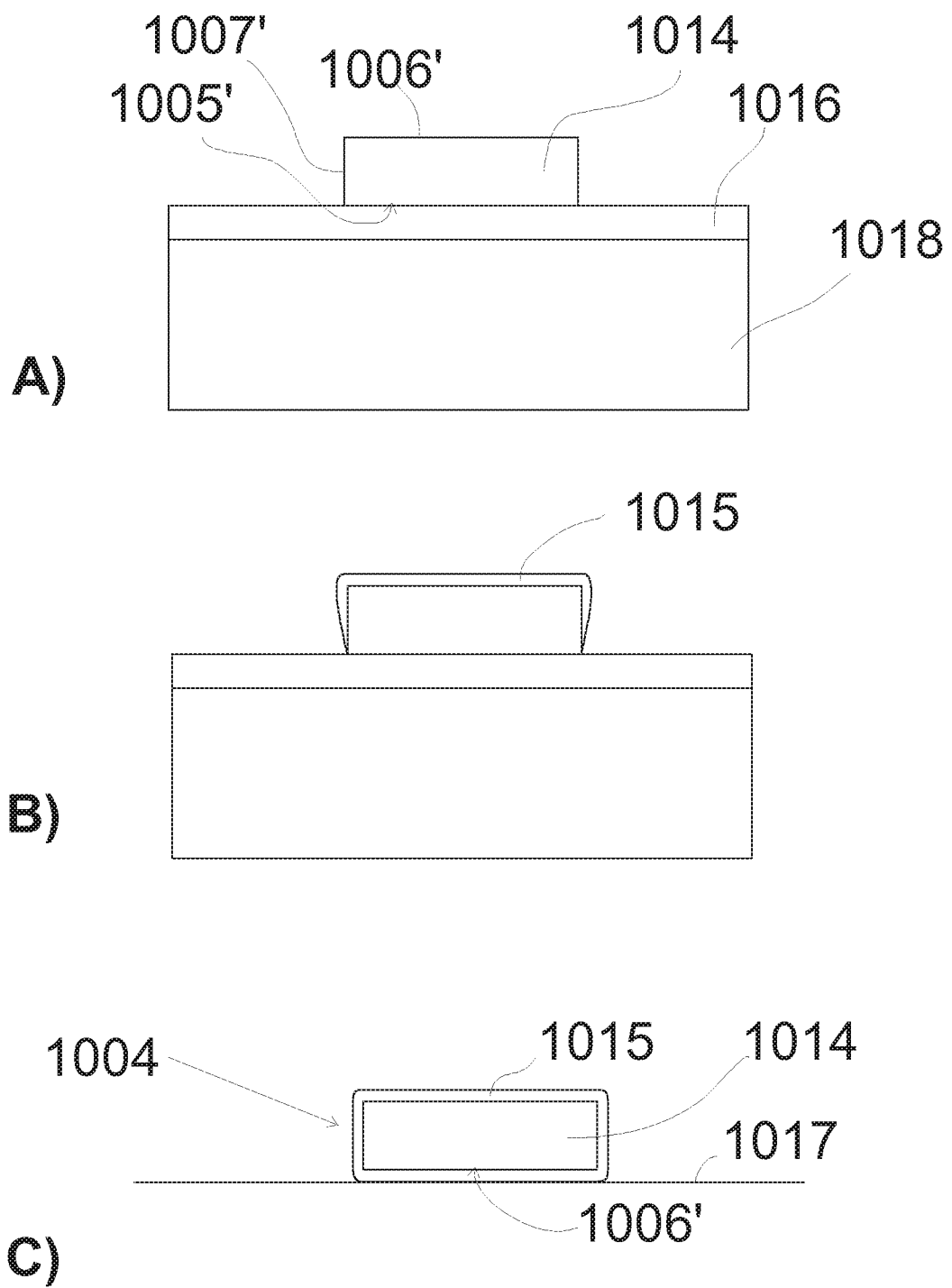

In the example of FIG. 10, the operation of providing the droplet holding plate comprises, as illustrated in drawing A of FIG. 10, forming an inner body 1014 of the droplet holding plate on a substrate layer 1016. The inner body is formed so as to have a plate-like body having an inner body first main surface 1005' facing towards the substrate layer and an inner body second main surface 1006', connected via an inner body peripheral edge surface 1007'.

In the example of FIG. 10, the substrate layer 1016 is an intermediate layer between a substrate body 1018 and the inner body. In other embodiments, stand-alone substrate layers may be used.

Depending on the material of the inner body, various manufacturing methods and processes may be used to form the inner body. For example, various materials, such as SU-8 or other photoresists, may be used to form an inner body layer on a substrate layer, of which layer the actual inner body may be formed, for example, photolitographically.

As illustrated in drawing B of FIG. 10, the inner body may be coated, for the free inner body second main surface 1006' and at least part of the peripheral edge surface 1007', by an electrically conductive material 1015, such as gold or some other metal or, for example, an electrically conductive polymer. Said coating operation may be carried out, for example, by sputtering.

Next, as illustrated in drawing C of FIG. 10, the partly coated inner body is released from the substrate layer and placed on a carrier surface 1017 with the coated inner body second main surface 1006' facing towards the carrier surface. In said releasing, for example, thermal expansion mismatch between the materials of the inner body and the substrate layer may be used.

Releasing may then be based on first heating the substrate layer and possible substrate body, together with the inner body formed on the substrate layer, to an elevated temperature, followed by cooling the stack to room temperature. With suitably selected heating and cooling procedures, thermal expansion mismatch between the materials of the substrate layer and the inner body may then facilitate cracking of the connection between the inner body and the surface layer.

After releasing the inner body from the surface layer, it may be flipped over and positioned on the carrier surface with the coated inner body second main surface facing towards the carrier surface by any appropriate means. For example, the released inner body may be handled by micro tweezers or vacuum micro grippers which may be teleoperable.

Next, the inner body first main surface and possibly uncoated rest of the inner body peripheral edge surface are coated by the electrically conductive material to form a continuous electrically conductive surface layer 1015 lying on, and enclosing, the inner body 1014. The electrically conductive surface layer may be formed so as to have a thickness, for example, of some micrometers to some tens of micrometers, for example, from 5 or 10 nanometers to 100 or 500 nanometers. For example, an electrically conductive surface layer of gold with a thickness of 80 nanometers has been successfully formed and tested on an SU-8 inner body. In some applications, an electrically conductive surface layer may have a thickness of some or even tens of micrometers.

Although manufacturing of one droplet holding plate 1004 is illustrated in FIG. 1, a plurality of droplet holding plates may be manufactured simultaneously, in a single process.

In one example basically in accordance with the process of FIG. 10, circular droplet holding plates were manufactured of SU-8 using UV lithography. First, 150 nm of aluminum as a substrate layer was sputtered on a silicon wafer serving as a substrate body. The wafer was then baked overnight in an oven at 120° C. Next, a 80 μm thick SU-8 layer was applied on the wafer by spin coating and baked for 15 min at 95° C. Then, SU-8 discs with a diameter of 1 mm were formed by standard UV lithography process. In the releasing operation, the silicon wafer with the aluminum surface layer and the inner body discs thereon was heated to 200° C. and cooled back to room temperature, causing releasing of the SU-8 discs from the aluminum. The electrically conductive surface layer was formed of gold by sputtering.

The carrier surface may be superhydrophobic. The microstructure of superhydrophobic surfaces is typically non-flat, resulting in small contact area between such surface and a body lying thereon. This may advantageously facilitate transferring the completed droplet holding plate from the carrier surface and attaching it to the sensing tip. A superhydrophobic carrier surface may be implemented, for example, as black silicon surface or any other surface with a micro structuring producing superhydrophobicity and/or sufficiently small contact area.

Figure 11:
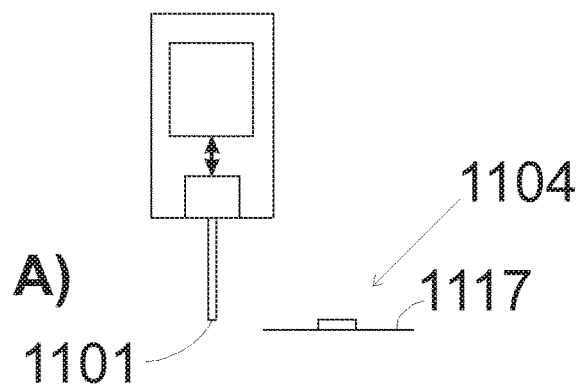
Figure 11:
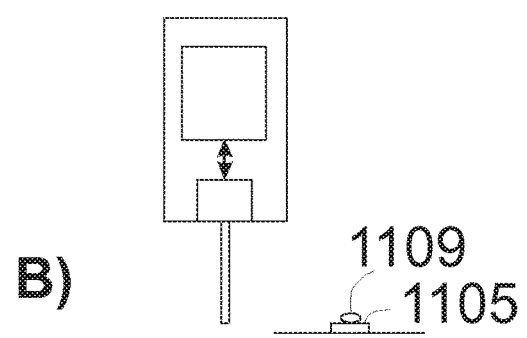
Figure 11:
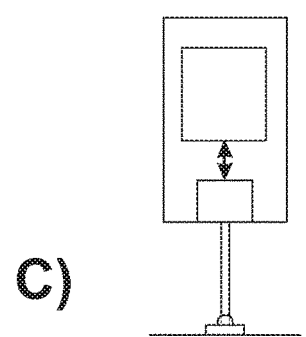
Figure 11:
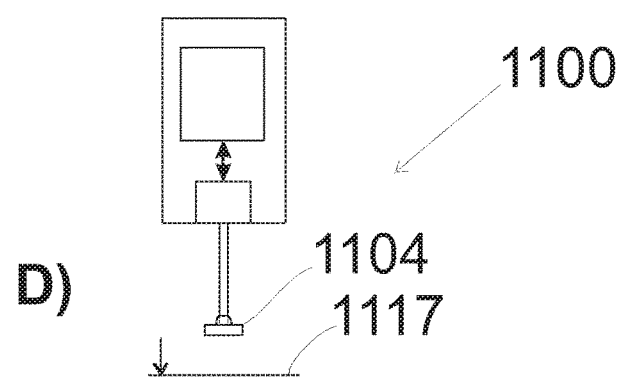

The attaching operation of FIG. 11 may be basically in accordance with that discussed above with reference to of FIG. 9. The complete droplet holding plate 1104 is initially carried on a superhydrophobic carrier surface 1117. As illustrated in drawings A to C of FIG. 11, the operation comprises applying curable adhesive 1109 on the first main surface 1105 of the droplet holding plate lying on the carrier surface; bringing the sensing tip into contact with the adhesive; and curing the adhesive.

Additionally in comparison to the example of FIG. 9, in the attaching process of FIG. 11, the force sensing probe and the carrier surface are pulled away from each other, as illustrated in drawing D of FIG. 11, thereby detaching the droplet holding plate from the carrier surface. Due to the superhydrophobicity of the carrier surface, the adhering forces between the droplet holding plate and the carrier surface may be so low that such detaching may advantageously take place without damaging or deforming the possibly very fragile droplet holding plate.

Some embodiments are further discussed shortly in the following.

In a first aspect, a force sensing probe for sensing snap-in and/or pull-off force of a liquid droplet brought into and/or separated from contact with a hydrophobic sample surface, respectively, comprises: a sensing tip; a sensor element connected to the sensing tip, capable of sensing sub-micronewton forces acting on the sensing tip in a measurement direction defined relative to the force sensing probe; and a droplet holding plate having a first main surface and a hydrophilic second main surface connected via a peripheral edge surface, and being attached via the first main surface to the sensing tip perpendicularly relative to the measurement direction for receiving and holding a liquid droplet as attached to the second main surface; the droplet holding plate comprising an electrically conductive surface layer, the first and the second main surfaces and the peripheral edge surface being defined by the surface layer.

In an embodiment, the droplet holding plate has a shape of a circular disc.

In an embodiment, which may be in accordance with the previous embodiment, the surface layer comprises a metal.

In an embodiment, in accordance with the previous embodiment, the surface layer comprises gold.

In an embodiment, which may be in accordance with any of the previous embodiments, the droplet holding plate has an inner body beneath the surface layer, the surface layer lying on the inner body.

In an embodiment in accordance with the previous embodiment, the inner body is formed of SU-8 photoresist.

In an embodiment, which may be in accordance with any of the previous embodiments, the peripheral edge surface has an undercut for preventing a liquid droplet held by the droplet holding plate from spreading outside the second main surface.

In an embodiment, which may be in accordance with any of the previous embodiments, the droplet holding plate has a maximum diameter of less than or equal to 5 mm, for example, less than or equal to 1 mm.

In an embodiment, which may be in accordance with any of the previous embodiments, the droplet holding plate has a thickness of less than or equal to 500 µm, preferably less than or equal to 100 µm.

In an embodiment, which may be in accordance with any of the previous embodiments, the sensing tip is connected to the sensor element via an elongated arm extending in the measurement direction and having a first end connected to the sensor element, and a second end, the sensing tip lying at the second end.

In an embodiment, which may be in accordance with any of the previous embodiments, the sensor element is a capacitive microelectromechanical sensor element.

In a second aspect, an apparatus for measuring snap-in and/or pull-off force of a liquid droplet brought into and/or separated from contact with a hydrophobic sample surface, respectively, comprises: a force sensing probe in accordance with the first aspect or any embodiment thereof discussed above; and a sample support, the sample support and the force sensing probe being movable relative to each other in the measurement direction between a contact position and a distant position with a liquid droplet held by the liquid holding plate in contact with and at a distance from a sample supported on the sample support, respectively.

In an embodiment of the second aspect, the sample support and the force sensing probe are movable relative to each other in at least one transverse direction perpendicular to the measurement direction.

In an embodiment of the second aspect, which may be in accordance with the previous embodiment, the apparatus further comprises a dispenser capable of shooting sub-nanolitre liquid droplet elements, and being configured and positioned to make a droplet element shot by the dispenser hit the second main surface of the droplet holding plate.

In an embodiment of the second aspect in accordance with the previous embodiment, the apparatus further comprises a hydrophobic surface element, the hydrophobic surface element and the dispenser being configured and positioned to make a droplet element shot by the dispenser hit the hydrophobic surface element and bounce off it and propagate further to the second main surface of the droplet holding plate.

In a third aspect, use of an apparatus in accordance with the second aspect or any embodiment thereof for measuring snap-in and/or pull-off force of a liquid droplet brought into and/or separated from contact with a hydrophobic sample surface of a sample placed on the sample support, respectively, comprises operations of: moving the force sensing probe having a liquid droplet held by the droplet holding plate and the sample support towards each other in the measurement direction other until the droplet contacts the sample surface, and moving the force sensing probe with the liquid droplet held by the droplet holding plate and the sample support away from each other until the droplet detaches from the sample surface; and measuring the snap-in force acting on the sensing tip in the measurement direction at the time of the droplet contacting the sample surface and/or the pull-off force acting on the sensing tip in the measurement direction at the time of the droplet detaching from the sample surface.

In an embodiment of the third aspect, wherein the sample support and the force sensing probe of the apparatus are movable relative to each other in at least one transverse direction perpendicular to the measurement direction, the use comprises: carrying out the operations of the use discussed above for a first measurement location on the sample surface; moving the sample support and the force sensing probe relative to each other in at least one transverse direction perpendicular to the measurement direction; and carrying out those operations of the use discussed above for a second measurement location on the sample surface.

In an embodiment of the third aspect, which may be in accordance with the previous embodiment, wherein the apparatus further comprises a dispenser capable of shooting sub-nanolitre liquid droplet elements, and is configured and positioned to make a droplet element shot by the dispenser hit the second main surface of the droplet holding plate, the use further comprises forming the liquid droplet on the second main surface of the droplet holding plate, said forming comprising: shooting a sub-nanolitre liquid droplet element by the dispenser to the second main surface of the droplet holding plate.

In an embodiment of the third aspect, which is in accordance with the previous embodiment, the use further comprises re-loading the liquid droplet held by the droplet holding plate after detachment of the liquid droplet from the sample surface by shooting a sub-nanolitre liquid droplet element by the dispenser to the liquid droplet via the hydrophobic surface element.

In a fourth aspect, a method for manufacturing a force sensing probe for sensing snap-in and/or pull-off force of a liquid droplet brought into and separated from contact with a hydrophobic sample surface, respectively, comprises operations of: providing a sensing tip and a sensor element connected to the sensing tip, the sensor element being capable of sensing sub-micronewton forces acting on the sensing tip in a measurement direction defined relative to the force sensing probe; providing a droplet holding plate having a first main surface and a hydrophilic second main surface for receiving and holding a liquid droplet as attached to the second main surface, the first and the second main surfaces being connected via a peripheral edge surface, the droplet holding plate comprising an electrically conductive surface layer, the first and the second main surfaces and the peripheral edge surface being defined by the surface layer;

and attaching the droplet holding plate to the sensing tip via the first main surface, perpendicularly relative to the measurement direction.

In an embodiment of the fourth aspect, the droplet holding plate is attached to the sensing tip by an adhesive.

In an embodiment of the fourth aspect, which is in accordance with the previous embodiment, the adhesive is solvable to allow replacement of the droplet holding plate.

In an embodiment of the fourth aspect, which may be in accordance with any of the previous embodiments of the fourth aspect, the droplet holding plate is in accordance with any of the embodiments of the first aspect discussed above.

In an embodiment of the fourth aspect, which may be in accordance with any of the previous embodiments of the fourth aspect, the operation of providing the droplet holding plate comprises: forming an inner body of the droplet holding plate on a substrate layer, the inner body having an inner body first main surface facing towards the substrate layer and an inner body second main surface, connected via an inner body peripheral edge surface; coating the inner body second main surface and at least part of the inner body peripheral edge surface by an electrically conductive material; releasing the inner body from the substrate and placing it on a carrier surface with the coated inner body second main surface facing towards the carrier surface; coating the inner body first main surface and possibly uncoated rest of the inner body peripheral edge surface by the electrically conductive material; whereby the electrically conductive material forms the electrically conductive surface layer of the droplet holding plate.

In an embodiment of the fourth aspect, which is in accordance with the previous embodiment of the fourth aspect, the carrier surface is superhydrophobic, and the operation of attaching the droplet holding plate to the sensing tip comprises: applying curable adhesive on the first main surface of the droplet holding plate lying on the carrier surface; bringing the sensing tip into contact with the adhesive; curing the adhesive; and pulling the force sensing probe and the carrier surface away from each other, thereby detaching the droplet holding plate from the carrier surface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A force sensing probe for sensing snap-in and/or pull-off force of a liquid droplet brought into and/or separated from contact with a hydrophobic sample surface, respectively, the force sensing probe comprising:
   a sensing tip;
   a sensor element connected to the sensing tip, capable of sensing sub- micronewton forces acting on the sensing tip in a measurement direction defined relative to the force sensing probe; and
   a droplet holding plate having a first main surface and a hydrophilic second main surface connected via a peripheral edge surface, and being attached via the first main surface to the sensing tip perpendicularly relative to the measurement direction for receiving and holding a liquid droplet as attached to the second main surface; the droplet holding plate comprising an electrically conductive surface layer, the first and the second main surfaces and the peripheral edge surface being defined by the surface layer, and wherein the droplet holding plate has a maximum diameter of less than or equal to 1 mm.

2. A force sensing probe as defined in claim 1, wherein the droplet holding plate has a thickness of less than or equal to 100 μm.

3. A force sensing probe as defined in claim 1, wherein the droplet holding plate has a shape of a circular disc.

4. A force sensing probe as defined in claim 1, wherein the peripheral edge surface has an undercut for preventing a liquid droplet held by the droplet holding plate from spreading outside the second main surface.

5. A force sensing probe as defined in claim 1, wherein the droplet holding plate has a thickness of less than or equal to 500 μm.

6. A force sensing probe as defined in claim 1, wherein the sensing tip is connected to the sensor element via an elongated arm extending in the measurement direction and having a first end connected to the sensor element, and a second end, the sensing tip lying at the second end.

7. A force sensing probe as defined in claim 1, wherein the sensor element is a capacitive microelectromechanical sensor element.

8. A force sensing probe as defined in claim 1, wherein the surface layer comprises a metal.

9. A force sensing probe as defined in claim 8, wherein the surface layer comprises gold.

10. A force sensing probe as defined in claim 1, wherein the droplet holding plate has an inner body beneath the surface layer, the surface layer lying on the inner body.

11. A force sensing probe as defined in claim 10, wherein the inner body is formed of SU-8 photoresist.

12. An apparatus for measuring snap-in and/or pull-off force of a liquid droplet brought into and/or separated from contact with a hydrophobic sample surface, respectively, the apparatus comprising:
    a force sensing probe as defined in claim 1; and
    a sample support, the sample support and the force sensing probe being movable relative to each other in the measurement direction between a contact position and a distant position with a liquid droplet held by the liquid holding plate in contact with and at a distance from a sample supported on the sample support, respectively.

13. An apparatus as defined in claim 12, wherein the sample support and the force sensing probe are movable relative to each other in at least one transverse direction perpendicular to the measurement direction.

14. An apparatus as defined in claim 12, further comprising a dispenser capable of shooting sub-nanolitre liquid droplet elements, and being configured and positioned to make a droplet element shot by the dispenser hit the second main surface of the droplet holding plate.

15. An apparatus as defined in claim 14, further comprising a hydrophobic surface element, the hydrophobic surface element and the dispenser being configured and positioned to make a droplet element shot by the dispenser hit the hydrophobic surface element and bounce off it and propagate further to the second main surface of the droplet holding plate.

16. A method of using an apparatus as defined in claim 12 for measuring snap-in and/or pull-off force of a liquid droplet brought into and/or separated from contact with a hydrophobic sample surface of a sample placed on the sample support, respectively, the method comprising operations of:
- moving the force sensing probe having a liquid droplet held by the droplet holding plate and the sample support towards each other in the measurement direction other until the droplet contacts the sample surface, and moving the force sensing probe with the liquid droplet held by the droplet holding plate and the sample support away from each other until the droplet detaches from the sample surface; and
- measuring the snap-in force acting on the sensing tip in the measurement direction at the time of the droplet contacting the sample surface and/or the pull-off force acting on the sensing tip in the measurement direction at the time of the droplet detaching from the sample surface.

17. The method of claim 16, wherein the sample support and the force sensing probe are movable relative to each other in at least one transverse direction perpendicular to the measurement direction, the method comprising:
- carrying out operations as defined in claim 16 for a first measurement location on the sample surface;
- moving the sample support and the force sensing probe relative to each other in at least one transverse direction perpendicular to the measurement direction; and
- carrying out the operations as defined in claim 16 for a second measurement location on the sample surface.

18. The method of claim 16, wherein the apparatus further comprising a dispenser capable of shooting sub-nanolitre liquid droplet elements, and being configured and positioned to make a droplet element shot by the dispenser hit the second main surface of the droplet holding plate, the method further comprising forming the liquid droplet on the second main surface of the droplet holding plate, said forming comprising:
- shooting a sub-nanolitre liquid droplet element by the dispenser to the second main surface of the droplet holding plate.

19. The method of claim 18, further comprising reloading the liquid droplet held by the droplet holding plate after detachment of the liquid droplet from the sample surface by shooting a sub-nanolitre liquid droplet element by the dispenser to the liquid droplet via the hydrophobic surface element.

20. A method for manufacturing a force sensing probe for sensing snap-in and/or pull-off force of a liquid droplet brought into and separated from contact with a hydrophobic sample surface, respectively, the method comprising operations of:
- providing a sensing tip and a sensor element connected to the sensing tip, the sensor element being capable of sensing sub-micronewton forces acting on the sensing tip in a measurement direction defined relative to the force sensing probe;
- providing a droplet holding plate having a first main surface and a hydrophilic second main surface for receiving and holding a liquid droplet as attached to the second main surface, the first and the second main surfaces being connected via a peripheral edge surface, the droplet holding plate comprising an electrically conductive surface layer, the first and the second main surfaces and the peripheral edge surface being defined by the surface layer; and
- attaching the droplet holding plate to the sensing tip via the first main surface, perpendicularly relative to the measurement direction.

21. A method as defined in claim 20, wherein the droplet holding plate has a shape of a circular disc.

22. A method as defined in claim 20, wherein the droplet holding plate is attached to the sensing tip by an adhesive.

23. A method as defined in claim 22, wherein the adhesive is solvable to allow replacement of the droplet holding plate.

24. A method as defined in claim 20, wherein the operation of providing the droplet holding plate comprises:
- forming an inner body of the droplet holding plate on a substrate layer, the inner body having an inner body first main surface facing towards the substrate layer and an inner body second main surface, connected via an inner body peripheral edge surface;
- coating the inner body second main surface and at least part of the inner body peripheral edge surface by an electrically conductive material;
- releasing the inner body from the substrate and placing it on a carrier surface with the coated inner body second main surface facing towards the carrier surface;
- coating the inner body first main surface and possibly uncoated rest of the inner body peripheral edge surface by the electrically conductive material;
- whereby the electrically conductive material forms the electrically conductive surface layer of the droplet holding plate.

25. A method as defined in claim 24, wherein the carrier surface is superhydrophobic, and the operation of attaching the droplet holding plate to the sensing tip comprises:
- applying curable adhesive on the first main surface of the droplet holding plate lying on the carrier surface;
- bringing the sensing tip into contact with the adhesive;
- curing the adhesive; and
- pulling the force sensing probe and the carrier surface away from each other, thereby detaching the droplet holding plate from the carrier surface.

\* \* \* \* \*